US006895362B2

(12) United States Patent
Davenport et al.

(10) Patent No.: US 6,895,362 B2
(45) Date of Patent: *May 17, 2005

(54) ACTIVE BROKEN RAIL DETECTION SYSTEM AND METHOD

(75) Inventors: David Michael Davenport, Niskayuna, NY (US); Ralph Thomas Hoctor, Saratoga Springs, NY (US); Nick Andrew Van Stralen, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/377,351

(22) Filed: Feb. 28, 2003

(65) Prior Publication Data

US 2004/0172216 A1 Sep. 2, 2004

(51) Int. Cl.[7] ................................................ G06F 11/30
(52) U.S. Cl. ..................... 702/182; 702/182; 702/115; 702/113; 702/54; 702/35; 246/120; 246/122 R; 73/11.06; 708/5; 708/246; 701/19
(58) Field of Search .............................. 702/33–35, 46, 702/53–54, 113, 115, 182, 189; 246/120, 122 R; 73/11.06; 708/5, 426; 701/19

(56) References Cited

U.S. PATENT DOCUMENTS

| 5,522,265 A | * | 6/1996 | Jaeggi ........................ 73/625 |
| 5,713,540 A | | 2/1998 | Gerszberg et al. |
| 5,903,517 A | | 5/1999 | Futsuhara et al. |
| 6,292,432 B1 | | 9/2001 | Futsuhara et al. |
| 2002/0045975 A1 | * | 4/2002 | Carr et al. ..................... 701/19 |
| 2002/0056398 A1 | * | 5/2002 | Bachtiger et al. ......... 105/157.1 |
| 2003/0038216 A1 | * | 2/2003 | Holgate .................. 246/122 R |

FOREIGN PATENT DOCUMENTS

| GB | 276374 | 8/1927 |
| GB | 2372569 A | 8/2002 |
| WO | WO0221119 A1 | 3/2002 |

OTHER PUBLICATIONS

Alippi et al., 'Composite Real–Time Image Processing for Railways Track Profile Measurement', Jun. 2000, IEEE Article, vol.: 49, No. 3, pp. 559–564.*
Esveld, 'Modern Railway Track', Jan. 2001, second edition, Delft University of Technology, pp. 1–66.*
Miura et al., 'Railway Technology Today 2', Mar. 1998, JRTR, pp. 38–45.*
Alippi et al., 'Composite Real–Time Image Processing for Railways Track Profile Measurement', Jun. 2000, IEEE Article, vol. 49, No. 3, pp. 559–564.*
Saotome et al., 'Crack Identification in Metalic Materials', Mar. 1993, IEEE Article, vol. 29, No. 2, pp. 1861–1864.*
Archambeau, 'Extending the Life of Bolted Rail', Dec. 1989, IEEE Article, pp. 63–67.*

(Continued)

Primary Examiner—Marc S. Hoff
Assistant Examiner—Elisa Desta
(74) Attorney, Agent, or Firm—Ann M. Agosti; Patrick K. Patnode

(57) ABSTRACT

A system to monitor the integrity of a railway track is provided. The system comprises a mechanical signal source and a correlation detector. The mechanical signal source coupled to the railway track and is configured for generating a mechanical signal pulse train over the railway track. The correlation detector monitors the integrity of the railway track by observing the pulse trains transmitted by the mechanical signal sources. If the railway track is intact, then the pulse train will travel to the correlation detector and afford the opportunity for repeatable detection.

28 Claims, 2 Drawing Sheets

OTHER PUBLICATIONS

PW. Loveday, "Development of Piezoelectric Transducers for a Railway Integrity Monitoring System", Proc of SPIE vol. 3988, Smart Systems for Bridges, Structures, and Highways, Mar. 2000, pp. 330–338.

Krautkramer, Ultrasonic Transducers for Nondestructive Testing, Product Catalog, Apr. 2001 Edition, 34 Pages.

Ruth Sanderson, et al, "The Use of Guided Waves for Non Destructive Testing of Rails: A Finite Element Approach", 2002 Abaqus UK Users Group Conference, pp. 1–15.

* cited by examiner

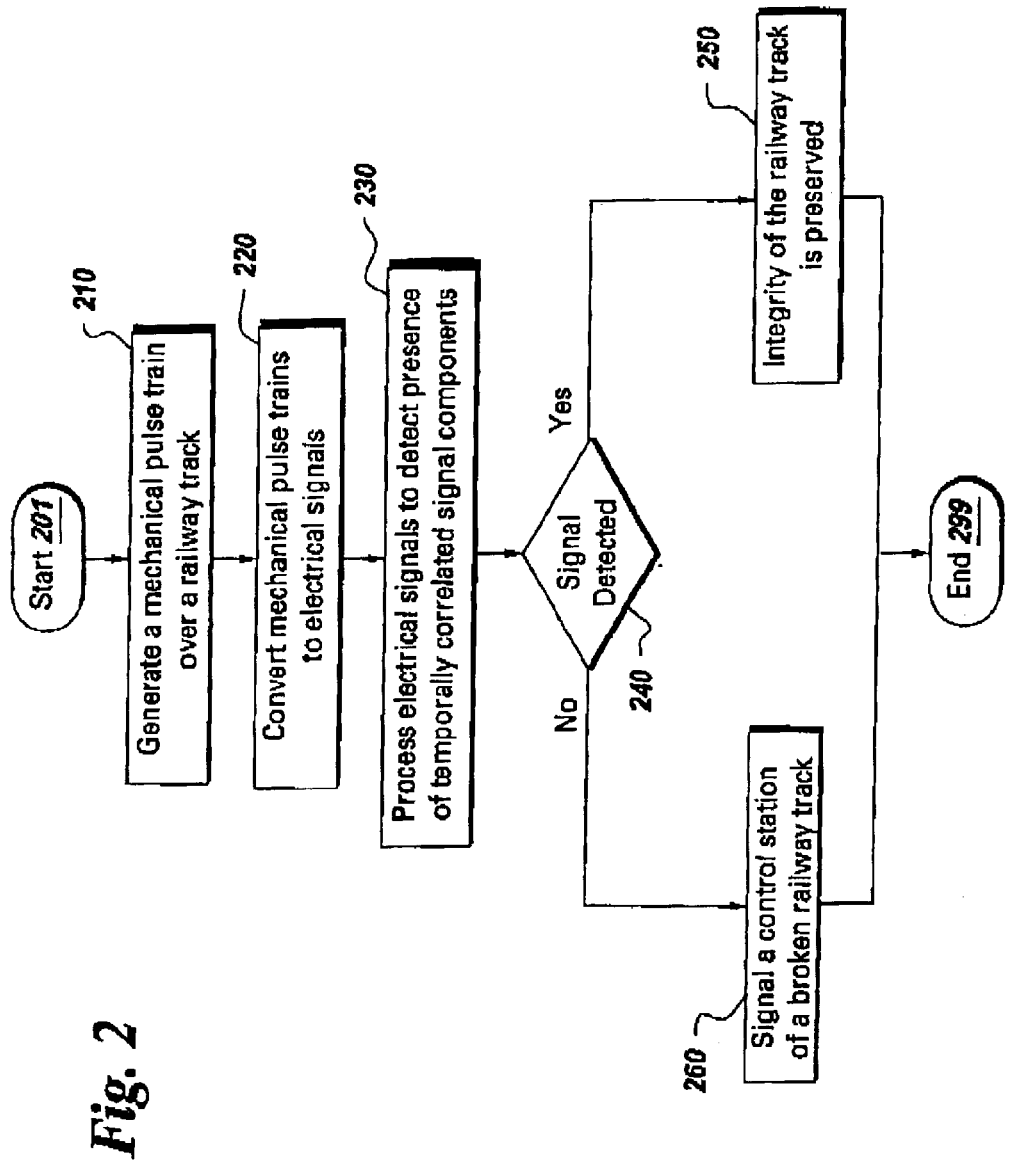

ACTIVE BROKEN RAIL DETECTION SYSTEM AND METHOD

BACKGROUND OF THE INVENTION

The invention relates generally to broken rail detection systems, and more specifically to a system and method for active detection of broken rails.

Many approaches exist to monitor the safety of railroad systems and to detect mechanical separation, or a break in the rails. One common approach is the use of electric track circuits in a predefined section or block of track wherein the lack of electrical continuity serves as an indication for railroad breaks. Manual inspection is also typically utilized to detect such rail breaks.

Another approach to detect railroad breaks is to transmit bursts of mechanical energy over the tracks at regular intervals. A transducer coupled to the rail provides an electrical signal representative of the mechanical signal. An energy detector is commonly used to detect the presence of the transmitted pulses and thus determine the integrity of the railroad. One problem with the approach is that the propagation channel presented by the rail is prone to dispersion, attenuation and environmental noise. These factors often complicate and limit the design and application of such energy detectors. Thus, energy detectors can be used for detection for fairly short ranges due to the above factors effecting propagation of the mechanical signal pulses.

Therefore, what is desired is a method and apparatus for actively detecting the integrity of railroad track over a large detection range.

BRIEF DESCRIPTION OF THE INVENTION

In one embodiment, a system to detect the integrity of a railway track is described. The system comprises a mechanical signal source and a correlation detector. The mechanical signal source is coupled to the railway track and configured for generating a mechanical signal pulse train over the railway track, the signal pulse train having a predetermined pulse repetition interval. The correlation detector comprises a mechanical signal transducer and a processor coupled to the transducer. The mechanical signal transducer is coupled to the railway track and configured for converting mechanical signals on the railway track to electrical signals. The processor is configured for processing the electrical signals to detect a presence of temporally correlated signal components, the correlated signal components being correlated with respect to the predetermined pulse repetition interval, wherein the detection is indicative that the transducer received the signal pulse train.

In another embodiment, a method to detect the integrity of a railway track is provided. The method comprises generating a mechanical signal pulse train over the railway track, the signal pulse train having a predetermined pulse repetition interval, converting mechanical signals on the railway track to electrical signals, and processing the electrical signals to detect the presence of temporally correlated signal components, the correlated signal components being correlated with respect to the predetermined pulse repetition interval, wherein the detection is indicative of a reception of the signal pulse train.

In another embodiment, a correlation detector for monitoring the integrity of a railway track comprises: a mechanical signal transducer coupled to the railway track and configured for converting mechanical signals on the railway track to electrical signals; and a processor coupled to the transducer and configured for processing the electrical signals to detect a presence of temporally correlated signal components, the correlated signal components being correlated with respect to a predetermined pulse repetition interval, wherein the detection is indicative that the transducer received a mechanical signal pulse train having a predetermined pulse repetition interval.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a flow chart illustration the method in which the integrity of the railway track is monitored.

DETAILED DESCRIPTION OF THE INVENTION

Figure 1:
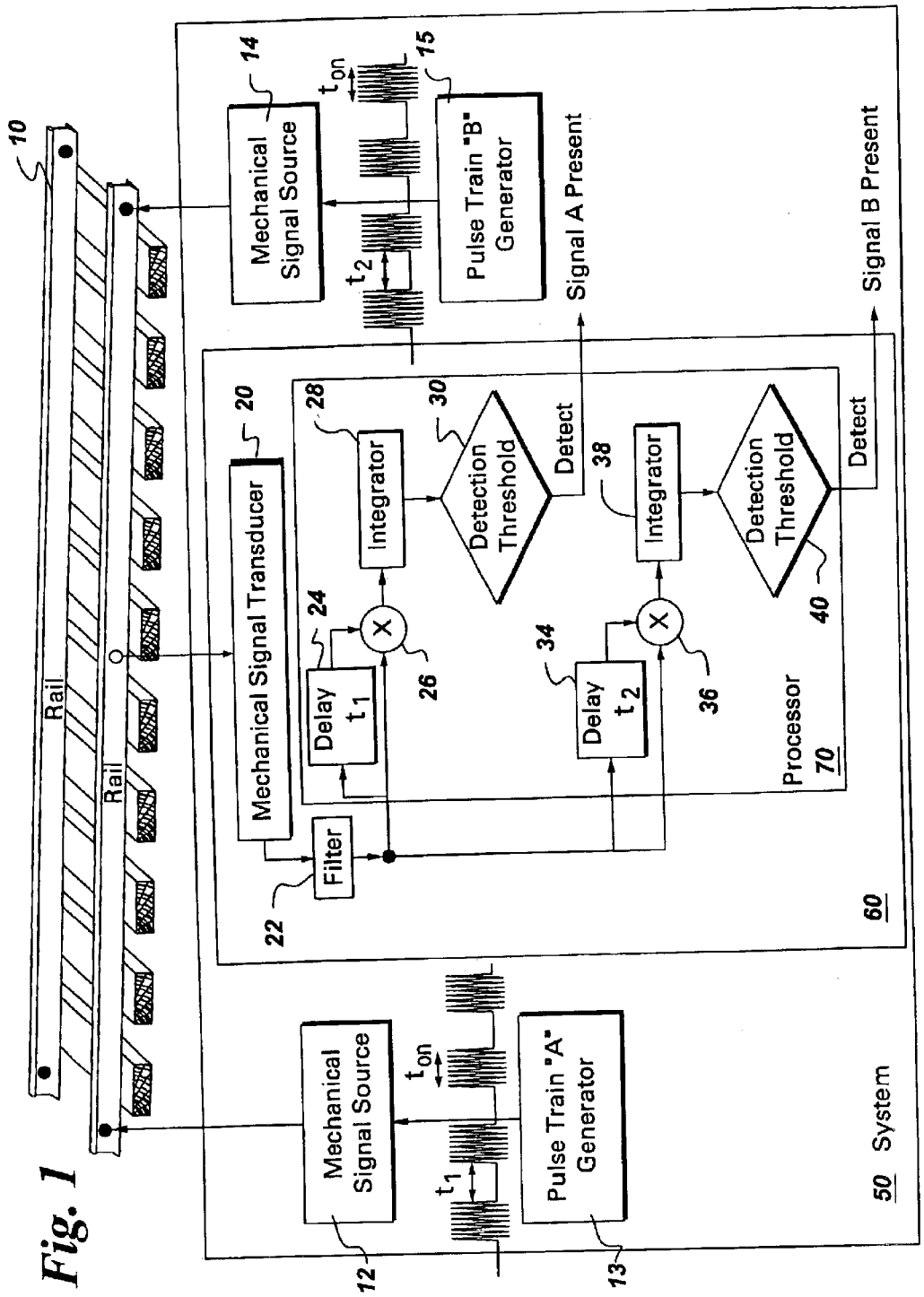
FIG. 1 is a block diagram of a system used for monitoring the integrity of a railway track.

FIG. 1 is a block diagram of system 50 used for monitoring the integrity of railway track 10. In accordance with one embodiment, system 50 comprises mechanical signal source 12 (or 14) and correlation detector 60. Each component is described in further detail below.

As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC) that are programmed to provide an output in response to given input signals.

Mechanical signal source (meaning at least one mechanical signal source) 12 or 14 is coupled to railway track 10 and configured for generating a mechanical signal pulse train (meaning at least one mechanical signal pulse train) over railway track 10, the signal pulse train having a predetermined pulse repetition interval. Typically, the pulses of the mechanical signal pulse train comprise bursts of acoustic, or ultrasonic, carrier signals. That is, these mechanical signal pulses possess non-zero frequency components that contain a significant portion of their energy.

In a more specific embodiment, the mechanical signal source comprises a plurality of signal sources each having at least one respective signal pulse train characterized by a unique respective pulse repetition interval.

In yet another embodiment, which may be used in embodiments with either single sources or multiple sources, a signal source is configured for generating a plurality of mechanical signal pulse trains with a first signal pulse train having a different predetermined pulse repetition interval from that of a second signal pulse train. In a related embodiment, the signal source further comprises pulse train generator 13 (meaning at least one pulse train generator) configured to transmit data bits by selecting between the first and second signal pulse trains.

The system also comprises a correlation detector 60 comprising: (i) a mechanical signal transducer (meaning at least one mechanical signal transducer) 20 coupled to railway track 10 and configured for converting mechanical signals on the railway track to electrical signals, and (ii) a processor (meaning at least one processor) 70 coupled to transducer 20 and configured for processing the electrical signals to detect a presence of temporally correlated signal components, the correlated signal components being correlated with respect to the predetermined pulse repetition interval or some integer multiple of the interval, wherein the detection is indicative that transducer 20 received the signal pulse train.

In a more specific embodiment, processor 70 further comprises delay block 24 (meaning at least one delay block) configured for receiving a first signal set and using the first signal set to create a second signal set. The first signal set comprises the electrical signals and the second signal set comprises a replicate of the first signal set at a predetermined delay. The processor is configured for using the first signal set and second signal set for correlation detection.

In an even more specific embodiment, processor 70 further comprises multiplier 36, integrator 38 and detection threshold 40. Multiplier 36 (meaning at least one multiplier) is configured for receiving the first signal set and the second signal set to generate a corresponding multiplicative output signal. Integrator 38 (meaning at least one integrator) is configured for receiving and integrating the multiplicative output signal. Detection threshold 40 (meaning at least one detection threshold) is configured for detecting the presence of the temporally correlated signal components by determining whether a peak output level of the integrated multiplicative output signal exceeds a predetermined threshold level.

Using a plurality of sets of delay blocks 24 and 34, multipliers 26 and 36, integrators 28 and 38, and detection thresholds 30 and 40 is useful for above-discussed embodiments wherein correlation detector 60 is designed to differentiate between a plurality of signal pulse trains. In some embodiments, the correlation detector is configured for detecting the presence of temporally correlated signal components from a plurality of pulse trains each having a unique respective pulse repetition interval. For example, in one embodiment, the correlation detector is adapted to differentiate between first and second signal pulse trains.

Using a plurality of delay blocks, multipliers and integrators is also useful for detecting a single signal pulse train, since a long train of pulses at pulse repetition interval T can be highly correlated at lags T, 2T, 3T and so on, provided that the lag is small compared to the duration of the entire pulse train. Correlation may be measured at multiple such lags, providing more total energy on which to base a detection.

FIG. 2 is a method illustrating the manner in which the integrity of a railway track can be monitored. The method begins at step 201, and control immediately passes over to step 210. In step 210, a mechanical signal pulse train is generated over the railway track, the signal pulse train having a predetermined pulse repetition interval. In step 220, the mechanical signals on the railway track are converted to electrical signals. In step 230, the electrical signals are processed to detect a presence of temporally correlated signal components. The correlated signal components are correlated with respect to the predetermined pulse repetition interval. The detection of the correlated signal components is indicative of a reception of the signal pulse train.

In a more specific embodiment, at step 210 a plurality of signal pulse trains characterized by unique respective pulse repetition intervals is generated. For example, in one embodiment, a plurality of mechanical signal pulse trains with a first signal pulse train having a different predetermined pulse repetition interval than a second signal pulse train is generated. Typically, step 210 is implemented using mechanical signal source 13 or 14.

In the illustrated embodiment, step 220 is implemented using mechanical signal transducer 20.

In an embodiment, step 230 comprises using a first signal set comprising the electrical signals to create a second signal set, the second signal set comprising a replicate of the first signal set at a predetermined delay. The first signal set and second signal set are used for correlation detection.

In a more specific embodiment, the processing step further comprises using the first signal set and the second signal set for generating a corresponding multiplicative output signal, integrating the multiplicative output signal, and detecting the presence of the temporally correlated signal components by determining whether a peak output level of the integrated multiplicative output signal exceeds a predetermined threshold level.

In an embodiment wherein a plurality of signal pulse trains are generated, step 230 comprises detecting the presence of temporally correlated signal components from a plurality of pulse trains each having a unique respective pulse repetition interval. In another embodiment, step 230 further comprises differentiating between the first and second signal pulse trains.

In an embodiment, the generating step of 210 further comprises transmitting data bits by selecting between the first and second signal pulse trains. In an embodiment, the pulses of the pulse train comprise bursts of acoustic or ultrasonic carrier signals.

In step 240, it is determined if the correlated signal components have been detected. If the signal components have been detected, control passes to step 250, where it is concluded that the integrity of the railway track is preserved. If the signal components are not detected, it is indicative of the presence of damage in the railway track and a control station can be immediately notified at step 260. The process ends at end step 299.

Various aspects of the invention can be used in a number of combinations. For example, FIG. 1 illustrates an embodiment of system 10 comprising a plurality of mechanical signal sources 12 and 14 (shown as two sources for ease of illustration) and at least one correlation detector 60 (shown as one correlation detector for ease of illustration). The embodiment is described in further detail below.

Mechanical signal sources 12 and 14 are coupled to railway track 10 and are configured for generating a plurality of mechanical signal pulse trains over the railway track. The mechanical signal sources each transmit a pulse train having at least one respective signal pulse train characterized by a corresponding pulse repetition interval. In the illustrated embodiment, the pulses of the pulse train comprise bursts of acoustic or ultrasonic, carrier signals. In an embodiment, the frequency of the ultrasonic signal ranges from 10 and 50 kHz.

In a more specific embodiment, the mechanical signal sources are configured for generating corresponding mechanical signal pulse trains with a first signal pulse train having a different predetermined pulse repetition interval than a second signal pulse train. In still a more specific embodiment, each mechanical signal source further comprises a pulse train generator configured to transmit data bits by selecting between the first and second signal pulse trains.

The duty cycle of the mechanical signal pulse train (on time as fraction of the pulse repetition interval) is set based on the amount of temporal spreading expected due to dispersion through the railway track. The longer the length of railway track to be traversed, the more dispersion and pulse spread will occur and thus, the longer the pulse repetition interval. In one example, each pulse is 10 millisecond long and the pulse repetition interval is 25 milliseconds. Examples of the mechanical signal source include piezoelectric stack transducers and electro-mechanical hammers.

Correlation detector 60 monitors the integrity of the railway track by observing the pulse trains transmitted by the mechanical signal sources. If the railway track is intact, then the pulse train will travel to the correlation detector and afford the opportunity for repeatable detection. In the illustrated embodiment, the correlation detector is shown comprising mechanical signal transducer 20, filter 22 and processor 70. Each component is described in further detail below.

Mechanical signal transducer 20 is coupled to the railway track and is configured for converting mechanical signals on the railway track to electrical signals. Filter 22 removes noise components from the electrical signals. Processor 70 is coupled to transducer 20 and configured for processing the electrical signals to detect a presence of temporally correlated signal components, the correlated signal components being correlated with respect to the predetermined pulse repetition intervals. In an embodiment, the temporally correlated signal components are correlated at multiples of the pre-determined pulse repetition interval.

The detection of the temporally correlated signal component is indicative that the transducer received a respective signal pulse train, thus indicating that the railway track integrity is preserved. The manner in which the processor operates corresponds to the above described embodiments. Examples of the mechanical signal transducer include piezoelectric stack transducer, and accelerometers employing piezoelectric elements.

Typically, the processor comprises delay blocks 24 and 34 and each delay block is configured for receiving a first signal set comprising the electrical signals. The processor uses the first signal set to create a respective second signal set, the second signal set comprising a replicate of the first signal set at a respective predetermined delay. It may be noted that delay blocks 24 and 34 may typically employ different pre-determined delays shown as t1 and t2 seconds for purpose of example. The processor is configured for using the first signal set and the second signal sets for correlation detection. The processor further typically comprises multipliers 26 and 36 configured for receiving and multiplying the first signal sets and a respective one of the second signal sets and generating a respective multiplicative output signal, integrators 28 and 38 configured for receiving and integrating a respective multiplicative output signal, and detection thresholds 30 and 40 each configured for detecting the presence of a respective temporally correlated signal component by determining whether a peak output level of a respective integrated multiplicative output signals exceeds a respective predetermined threshold level. In these embodiments, the correlation detector is adapted to differentiate between different signal pulse trains.

Mathematically, the correlation operation can be represented as:

$$z(t) = \int_{t-W}^{t} x(\tau)x(\tau - D)d\tau \qquad \text{Equation (1)}$$

where z(t) is the output of the correlator at time t, x(t) represents the signal plus noise at time t, W is the duration of the transmitted pulse train and D represents the duration of the interval between successive pulses of the pulse train. In the embodiment depicted in FIG. 1, Equation (1) represents blocks 24, 26 and 28. The signal z(t) is compared to a threshold to implement the correlation detector.

Although Equation 1 describes an analog operation performed on continuous-time signals, it may be appreciated that the signals could be digitized by an analog-to-digital converter at various stages of processing. For example, the signal z(t) could be digitized prior to comparison with the threshold. The sample rate for such operations would be such that the output correlation pulse associated with pulse train reception, which has approximately the duration of one of the pulses, is sampled at least once. Additionally, the signal x(τ) could be digitized and the operation represented by Equation 1 and could be performed in a microprocessor or other processing means. Such an operation typically requires a high sample rate, such that each cycle of each received mechanical pulse would be sampled at least twice.

The embodiments described above have several advantages, including better probability of detection and lower received noise energy than would be obtained from a simple energy detector. Thus, the invention can be used to increase the detection range for broken rail monitoring.

It is advantageous for the lag at which the signal is correlated to be higher than the correlation time constant of the additive white noise so that the correlation of the noise at the lag of highest correlation of the signal is very low, resulting in an enhanced signal-to-noise ratio. Typically, it is desirable to have a large bandwidth for filter 22, so that the correlation of their outputs is small at the lag used for signaling.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system to monitor the integrity of a railway track, the system comprising:
    (a) a mechanical signal source coupled to the railway track and configured for generating a mechanical signal pulse train over the railway track, the signal pulse train having a predetermined pulse repetition interval; and
    (b) a correlation detector comprising:
        (i) a mechanical signal transducer coupled to the railway track and configured for converting mechanical signals on the railway track to electrical signals, and
        (ii) a processor coupled to the transducer and configured for processing the electrical signals to detect a presence of temporally correlated signal components, the correlated signal components being correlated with respect to the predetermined pulse repetition interval, wherein the detection is indicative that the transducer received the signal pulse train.

2. The system of claim 1, wherein the processor comprises:
a delay block configured for receiving a first signal set, the first signal set comprising the electrical signals, and using the first signal set to create a second signal set, the second signal set comprising a replicate of the first signal set at a predetermined delay,
wherein the processor is configured for using the first signal set and second signal set for correlation detection.

3. The system of claim 2 wherein the processor further comprises:
a multiplier configured for receiving the first signal set and the second signal set to generate a corresponding multiplicative output signal,
an integrator configured for receiving and integrating the multiplicative output signal, and
a detection threshold configured for detecting the presence of the temporally correlated signal components by determining whether a peak output level of the integrated multiplicative output signal exceeds a predetermined threshold level.

4. The system of claim 1, wherein the correlation detector is configured for detecting the presence of temporally correlated signal components from a plurality of pulse trains each having a unique respective pulse repetition interval.

5. The system of claim 4, wherein the temporally correlated signal components are correlated at multiples of the unique respective pulse repetition interval.

6. The system of claim 4, wherein the mechanical signal source comprises a plurality of signal sources each having at least one respective signal pulse train characterized by a unique respective pulse repetition interval.

7. The system of claim 4 wherein the mechanical signal source is configured for generating a plurality of mechanical signal pulse trains with a first signal pulse train having a different predetermined pulse repetition interval than a second signal pulse train.

8. The system of claim 7, wherein the correlation detector is adapted to differentiate between the first and second signal pulse trains.

9. The system of claim 8, wherein the mechanical signal source further comprises a pulse train generator configured to transmit data bits by selecting between the first and second signal pulse trains.

10. The system of claim 1, wherein the pulses of the pulse train comprise bursts of acoustic or ultrasonic carrier signals.

11. A method to monitor the integrity of a railway track, the method comprising:
generating a mechanical signal pulse train over the railway track, the signal pulse train having a predetermined pulse repetition interval; and
converting mechanical signals on the railway track to electrical signals, and
processing the electrical signals to detect a presence of temporally correlated signal components, the correlated signal components being correlated with respect to the predetermined pulse repetition interval, wherein the detection is indicative of a reception of the signal pulse train.

12. The method of claim 11, wherein the processing comprises:
using a first signal set comprising the electrical signals to create a second signal set, the second signal set comprising a replicate of the first signal set at a predetermined delay,
wherein the first signal set and second signal set are used for correlation detection.

13. The method of claim 12 wherein the processing further comprises:
using the first signal set and the second signal set for generating a corresponding multiplicative output signal,
integrating the multiplicative output signal, and
detecting the presence of the temporally correlated signal components by determining whether a peak output level of the integrated multiplicative output signal exceeds a predetermined threshold level.

14. The method of claim 11, wherein the processing comprises detecting the presence of temporally correlated signal components from a plurality of pulse trains each having a unique respective pulse repetition interval.

15. The method of claim 14, wherein the temporally correlated signal components are correlated at multiples of the unique respective pulse repetition interval.

16. The method of claim 14, wherein the generating comprises generating a plurality of signal pulse trains characterized by a unique respective pulse repetition interval.

17. The method of claim 14, wherein the generating comprises generating a plurality of mechanical signal pulse trains with a first signal pulse train having a different predetermined pulse repetition interval than a second signal pulse train.

18. The method of claim 17, wherein the processing further comprises differentiating between the first and second signal pulse trains.

19. The method of claim 18, wherein the generating further comprises a transmitting data bits by selecting between the first and second signal pulse trains.

20. The method of claim 11, wherein the pulses of the pulse train comprise bursts of acoustic or ultrasonic carrier signals.

21. A system to monitor the integrity of a railway track, the system comprising:
(a) a plurality of mechanical signal sources coupled to the railway track and configured for generating a plurality of mechanical signal pulse trains over the railway track, the signal pulse trains having respective predetermined pulse repetition intervals; and (b) a correlation detector comprising:

(i) a mechanical signal transducer coupled to the railway track and configured for converting mechanical signals on the railway track to electrical signals, and (ii) a processor coupled to the transducer and configured for processing the electrical signals to detect a presence of temporally correlated signal components, the correlated signal components being correlated with respect to the predetermined pulse repetition intervals, wherein the detection of a temporally correlated signal component is indicative that the transducer received a respective signal pulse train, wherein the processor comprises a plurality of delay blocks, each delay block configured for receiving a first signal set comprising the electrical signals, and using the first signal set to create a respective second signal set, the second signal set comprising a replicate of the first signal set at a respective predetermined delay, wherein the processor is configured for using the first signal set and the second signal sets for correlation detection.

22. The system of claim 21, wherein the processor further comprises:
- a plurality of multipliers, each configured for receiving and multiplying the first signal sets and a respective one of the second signal sets and generating a respective multiplicative output signal,
- a plurality of integrators, each configured for receiving and integrating a respective multiplicative output signal, and
- a plurality of detection thresholds, each configured for detecting the presence of a respective temporally correlated signal component by determining whether a peak output level of a respective integrated multiplicative output signals exceeds a respective predetermined threshold level.

23. The system of claim 21, wherein each one of the plurality of mechanical signal sources is configured for generating a plurality of mechanical signal pulse trains with a first signal pulse train having a different predetermined pulse repetition interval than a second signal pulse train.

24. The system of claim 23, wherein the correlation detector is adapted to differentiate between the first and second signal pulse trains.

25. The system of claim 23, wherein each one of the plurality of mechanical signal sources further comprises a pulse train generator configured to transmit data bits by selecting between the first and second signal pulse trains.

26. The system of claim 21, wherein the pulses of the pulse train comprise bursts acoustic or ultrasonic carrier signals.

27. A correlation detector for monitoring the integrity of a railway track, the detector comprising:
 (a) a mechanical signal transducer coupled to the railway track and configured for converting mechanical signals on the railway track to electrical signals, and
 (b) a processor coupled to the transducer and configured for processing the electrical signals to detect a presence of temporally correlated signal components, the correlated signal components being correlated with respect to a predetermined pulse repetition interval, wherein the detection is indicative that the transducer received a mechanical signal pulse train having a predetermined pulse repetition interval.

28. The correlation detector of claim 27, wherein the processor comprises:
- a delay block configured for receiving a first signal set, the first signal set comprising the electrical signals, and using the first signal set to create a second signal set, the second signal set comprising a replicate of the first signal set at a predetermined delay, wherein the processor is configured for using the first signal set and second signal set for correlation detection,
- a multiplier configured for receiving the first signal set and the second signal set to generate a corresponding multiplicative output signal,
- an integrator configured for receiving and integrating the multiplicative output signal, and
- a detection threshold configured for detecting the presence of the temporally correlated signal components by determining whether a peak output level of the integrated multiplicative output signal exceeds a predetermined threshold level.

* * * * *